United States Patent [19]
Mashimo

[11] 3,743,912
[45] July 3, 1973

[54] SERVO-CONTROL SYSTEM

[75] Inventor: Yukio Mashimo, Tokyo, Japan

[73] Assignee: Canon Kabushiki Kaisha, Tokyo, Japan

[22] Filed: Oct. 16, 1970

[21] Appl. No.: 81,680

[30] Foreign Application Priority Data

| Oct. 28, 1969 | Japan | 44/86250 |
| Apr. 3, 1970 | Japan | 45/28465 |
| Apr. 20, 1970 | Japan | 45/33615 |
| June 19, 1970 | Japan | 45/53661 |
| June 19, 1970 | Japan | 45/53662 |
| Oct. 28, 1969 | Japan | 44/102431 |
| Jan. 27, 1970 | Japan | 45/8452 |
| Apr. 22, 1970 | Japan | 45/39195 |
| May 11, 1970 | Japan | 45/45826 |
| June 19, 1970 | Japan | 45/61401 |
| June 27, 1970 | Japan | 45/64316 |

[52] U.S. Cl. ................ 318/599, 318/640, 318/663
[51] Int. Cl. ............................................ G06b 11/28
[58] Field of Search .................. 318/663, 640, 599

[56] References Cited
UNITED STATES PATENTS

| 3,605,001 | 9/1971 | Miyakawa | 318/640 X |
| 3,110,851 | 11/1963 | Plogstedt et al. | 318/681 X |
| 3,327,186 | 6/1967 | Gregory et al. | 318/663 X |
| 3,427,941 | 2/1969 | Metzger | 318/599 X |
| 3,426,662 | 2/1969 | Sevin | 318/599 X |
| 3,450,969 | 6/1969 | Sato et al. | 318/681 X |
| 3,472,142 | 10/1969 | Fahlenberg | 318/663 |
| 3,652,912 | 3/1972 | Bordonaro | 318/599 |

Primary Examiner—B. Dobeck
Attorney—McGlew & Toren

[57] ABSTRACT

A servo-control system comprising a bridge circuit, a detector circuit, a motor, and a control circuit which functions as a pulsive switching circuit, said detector circuit being controlled by the output of said bridge circuit, said motor being controlled by the output of said bridge circuit through a said detector circuit under the control of said control circuit and controlling and bringing said bridge circuit to a balanced condition.

31 Claims, 30 Drawing Figures

Patented July 3, 1973

INVENTOR.
YUKIO MASHIMO
BY McGlew and Toren
ATTORNEYS

Patented July 3, 1973

INVENTOR.
YUKIO MASHIMO
BY McGlew and Toren
ATTORNEYS

Patented July 3, 1973

INVENTOR.
YUKIO MASHIMO
BY McGlew and Toren
ATTORNEYS

Patented July 3, 1973

INVENTOR.
YUKIO MASHIMO
BY McGlew and Toren
ATTORNEYS

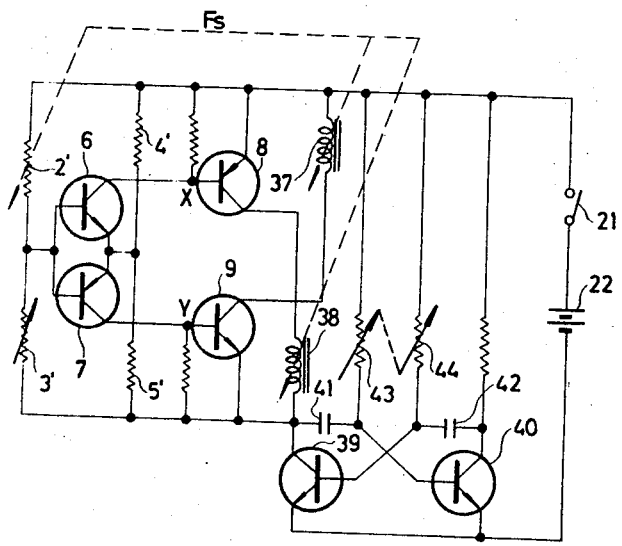

Patented July 3, 1973

INVENTOR.
YUKIO MASHIMO
BY McGlew and Toren
ATTORNEYS

Patented July 3, 1973 3,743,912

INVENTOR.
YUKIO MASHIMO
BY McGlew and Toren
ATTORNEYS

Patented July 3, 1973

INVENTOR.
YUKIO MASHIMO
BY McGlew and Toren
ATTORNEYS

INVENTOR.
YUKIO MASHIMO
BY McGlew and Toren
ATTORNEYS

Patented July 3, 1973

INVENTOR.
YUKIO MASHIMO
BY McGlew and Toren
ATTORNEYS

SERVO-CONTROL SYSTEM

The present invention relates to a servo-control system for a small sized portable machine, such as an automatic iris control device of a movie camera or the like.

In general, a servo-control system for driving an automatic iris control device of a movie camera or the like, has such a defect as a hunting phenomenon and an unstable operation caused by an inertia of a motor or the like. In order to prevent the defect, there has been employed a motor with a damping coil, to which current of an opposite polarity is given a tachogenerator with feed-back to its input, or the like. However, all of these make the system complicated and undesirable for a servo-control system of a small-sized portable machine and have such a defect such as insufficiency in braking operation due to a tendency of a non-sensitive zone being enlarged.

The present invention is to provide an improved servo-control system, which has overcome the above defects of the conventional devices.

One of the objects of the present invention is to provide a servo-control system comprising a bridge circuit, a detector circuit, a motor, a control circuit which functions as a pulsive switching circuit, and a start switch for activating the control circuit under the control of the output of said detector circuit, said detector circuit being controlled by the output of said bridge circuit, said motor being controlled by the output of said bridge circuit through said detector circuit under the control of said control circuit and controlling and bringing said bridge circuit to a balanced condition.

Another object of the present invention is to provide a servo-control system comprising a comparator circuit, a detector circuit, a motor and a chopper which functions as a pulsive switching circuit, said chopper chopping at a certain time interval for the brake of the system, said detector circuit being controlled by the output of said comparator, said motor being controlled by the output of said comparator circuit through said detector circuit under the control of said chopper, and controlling and bringing said comparator circuit to a balanced condition.

Still another object of the present invention is to provide a servo-control system comprising a comparator a detector circuit, a motor, a control circuit which functions as a switching circuit; said detector circuit being controlled by the output of said comparator, said motor being controlled by the output of said comparator through said detector circuit under the control of said control circuit and controlling and bringing said comparator to a balanced condition, and said control circuit comprising an integrator and a feed-back connection from said integrator to the detector circuit, said integrator being controlled by the current through the motor.

Features of one embodiment of the present invention lie in a servo-control system, comprising a motor, having two driving coils, wound with a polarity opposite to each other, and being driven by a two-output astable multivibrator. By controlling the pulse width of the output of the multivibrator with an unbalanced output from the bridge in case multivibrator is actuvated by a start switch, the motor is normally or reversely rotated to operate an automatic iris control mechanism or the like. Features of a second embodiment of the present invention lie in that the output of the bridge circuit is detected by a detector circuit and the astable multivibrator is controlled by the output from the detector circuit, and the output of the multivibrator drives the motor, having two driving coils, which are wound with a polarity opposite to each other.

Features of a third embodiment of the present invention lie in a servo-control system, comprising a motor having a single driving coil driven by a two-output astable multivibrator. By controlling the pulse width of the output of the multivibrator with an unbalanced output of the bridge, the motor is normally or reversely rotated to operate an automatic iris control mechanism or the like.

Features of a fourth embodiment of the present invention lie in a servo-control system, in which an effective braking power can be obtained by an intermittent derive of the motor through an electric or electromagnetic chopper.

In a fifth embodiment of the present invention, the motor is driven by a pulse current from a pulse oscillator and the driving pulsive power of the motor is decreased before the stop of the motor by the change of the pulse period, and thus, a braking action can be electronically performed. Namely, the pulse period of the pulse oscillator for driving the motor changes correspondingly with the unbalanced output from the bridge.

In a sixth embodiment of the present invention there is provided a braking circuit of a servo-control system for operating an automatic iris control device of a movie camera or the like, characterized by that a braking action is performed by an electronic chopper circuit, without particularly using a damping coil or the like, and the non-sensitive zone is not enlarged and the servo-motor can be started in a quite short rising time.

In a seventh embodiment of the present invention the motor is driven under the control of a pulse signal from a pulse oscillating circuit, which comprises a time constant circuit and a thyrister with four terminals. The braking action can be electronically performed in the servo-control system, and the circuit construction may be simplified by employing the thyrister of a four terminal construction.

In an eighth embodiment of the present invention a current, passing through a driving coil of the motor is given with an intermittent wave form to get a braking effect, and thus, the instability of the operation caused by a hunting, is eliminated to perform a stable operation. That is, the voltage drop in the driving coil is utilized to control the switching circuit through integration of the current in response to the voltage drop and to cause interruption of the driving current of the motor.

In a ninth embodiment of the present invention the motor is rotated by the output of the astable multivibrator, which is started or stopped by the signal from a detector circuit.

In a 10th embodiment of the present invention the motor is caused to rotate in a direction in response to the output from the detector circuit, by a switch under the control of a pulse oscillator and the motor is caused to terminate to function as a generator to effect a braking effect.

In an 11th embodiment of the present invention the driving current of the motor is given with an intermittent wave form through a rectangular wave oscillator to obtain a braking effect.

Thus, the present invention has many advantages that the circuit can be simplified, and it is easy to regulate the length of the intermittent wave pulse and moreover, it is easy to adopt integrating circuitries for miniaturizing the system.

Further, the present invention has an advantage that power consumption is remarkably reduced by a switching control of the system and the system constituting elements.

The present invention shall be described in reference to the attached drawings in which:

FIG. 1 is a block diagram of a servo-control system in accordance with the present invention; FIG. 2 is a first embodiment of a servo-control system for a movie camera according to the present invention; FIG. 3 shows a wave form in a servo-control system in accordance with the present invention; and FIG. 4 illustrates the operational characteristics of the system shown in FIG. 2.

FIGS. 10 to 13 are schematic circuit diagrams, showing examples of the fourth embodiment in accordance with the present invention.

The same numbers and designations throughout the attached drawings show the same elements with similar functions.

Figure 1:
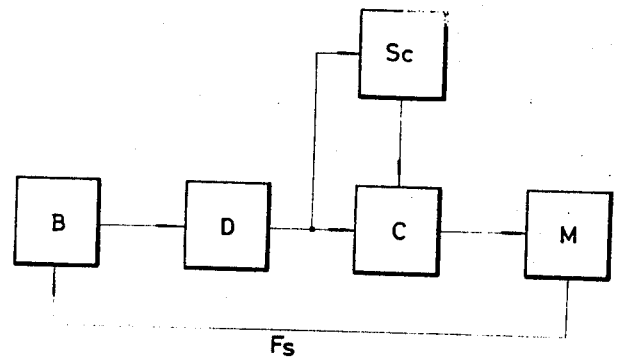

In FIG. 1, B is a bridge circuit possibly including a differential amplifier circuit, D is a detector circuit, C is a control circuit, M is a motor and Sc is a start switch for the controller circuit. Fs shows a feed-back loop of the system.

When the system is actuvated, the unbalanced output from the bridge circuit B starts the control circuit C with the aid of the start switch Sc through the detector circuit D, and the output from the control circuit C drives the motor M to bring the bridge circuit B into a balanced state through the loop Fs.

Figure 2:
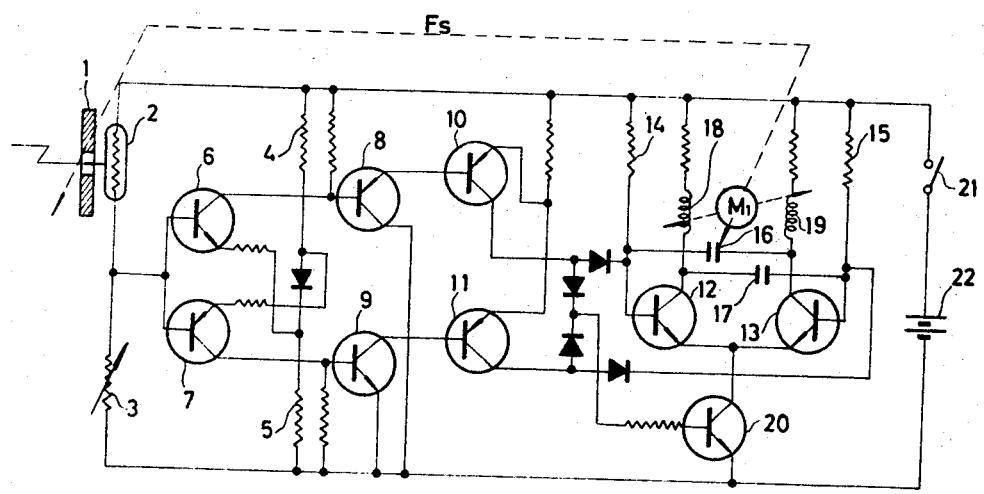

The first embodiment shown in FIG. 2 will be explained referring to FIGS. 3 and 4. $1-a_1$, $1-a_2$ and $1-a_3$ show respectively a wave from in a coil 18, and $1-b_1$, $1-b_2$ and $1-b_3$, a wave form in a coil 19. 1 is an iris control mechanism, interlocking with a motor $M_1$, and 2 is a photo-conductive element (for example of CdS), the incident light to which being regulated by automatically controlling the iris. 3 is a variable resistor for setting a photographing information, such as the film sensitivity, etc. 4 and 5 are resistors, which compose a bridge circuit with the resistors 2 and 3. 6 and 7 are first-stage transistors in a bridge output detector circuit; 8 and 9 are amplifier transistors; 10 and 11 are output-stage transistors of the detector circuit. 12 and 13 are transistors, composing an astable multivibrator. 14 and 15 are resistors and 16 and 17 are capacitors. These compose a pair of time constant circuits. 18 and 19 are driving coils, wound with a polarity opposite to each other to compose the motor $M_1$. 20 is a starter transistor for controlling actuvation and actuation of a multivibrator, 21 is a main switch for the system, and 22 is a battery as a power source.

Next, the operation of the embodiment shown in FIG. 2 will be explained. If the incident light to the photo-conductive element 2 reaches a suitable level and the resistors 2, 3, 4 and 5 are balanced, all of the transistors 6, 7, 8, 9, 10 and 11 in the detector circuit become non-conductive and as the base of the starter transistor 20 is connected with the output terminals of the detector circuit, the transistor 20 becomes non-conductive. Therefore the astable multivibrator circuit is not actuated and no current flows through the two driving coils 18 and 19 of the motor $M_1$. Thus the motor is maintained in a stop condition and the bridge circuit remains in a balanced condition. If the incident light to the photo-conductive element 2 decreases and its resistance value is increased, the first-stage transistor 7 becomes conductive, and then, the transistors 9 and 11 become conductive, whereby the starter transistor 20 becomes conductive and thus the multivibrator begins to actuate. At this time, the resistor 15 of one of the time constant circuits of the multivibrator is connected in parallel with the output circuit of the output transistor 11 of the detector circuit. Thus the time constant of this circuit becomes shorter and such pulses as shown by $1-a_2$ and $1-b_2$ in FIG. 3 passes through the driving coils 18 and 19 respectively. The motor $M_1$ is rotated in response to the difference between the widths of both pulses, and the iris control mechanism is set in rotation to bring the bridge circuit back to a balanced condition.

Figure 4:
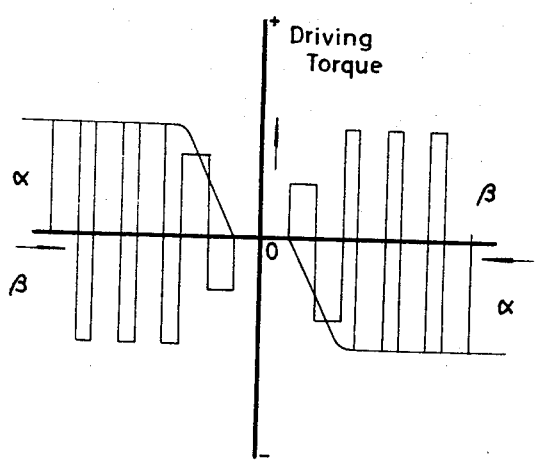

FIG. 4 shows the relation between the driving pulsive torque of the motor and the output from the bridge circuit. $\alpha$ shows the driving torque while $\beta$ shows the braking torque. In a condition shown in the left-half side of the drawing, the motor $M_1$ is supposed to rotate normally as a positive torque being generated as a difference between the positive torque and the negative torque. While in a condition shown in the right-half side of the drawing, the motor $M_1$ is reversely rotated as a negative torque being generated.

Figure 3:
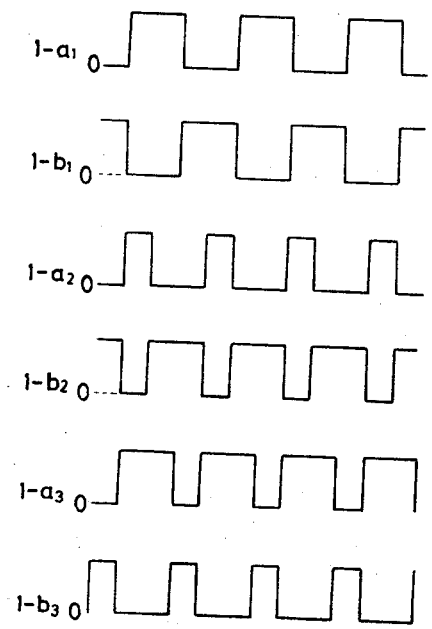

When the bridge circuit approaches to a balanced condition, pulses of such wave forms as shown by 1-$a_1$, and 1-$b_1$ in FIG. 3, pass through two driving coils 18 and 19. When the difference of the pulse widths become zero, the motor is stopped. In this condition, the bridge circuit is balanced and the transistors 7, 9 and 11 become non-conductive. Thus, the starter transistor 20 becomes non-conductive and the actuation of the multivibrator is stopped.

Next, when the incident light to the photo-conductive element 2 increases the bridge circuit becomes unbalanced again, and in this case the transistors 6, 8 and 10 become conductive and then, the transistor 20 becomes conductive. Thus the multivibrator begins to actuate and such pulses as shown by 1-$a_3$ and 1-$b_3$ in FIG. 3 pass through the motor $M_1$. Accordingly, the motor $M_1$ is set in motion in response to the difference of the pulse lengths. The bridge circuit is brought back to a balanced condition again. In this case, the resistor 14 of the multivibrator is put in parallel with the impedance of the output transistor 10.

As above, in the first embodiment of the present invention, the servo-control system is assured of a quite high degree of precision as clearly understood from FIG. 4.

Figure 5:
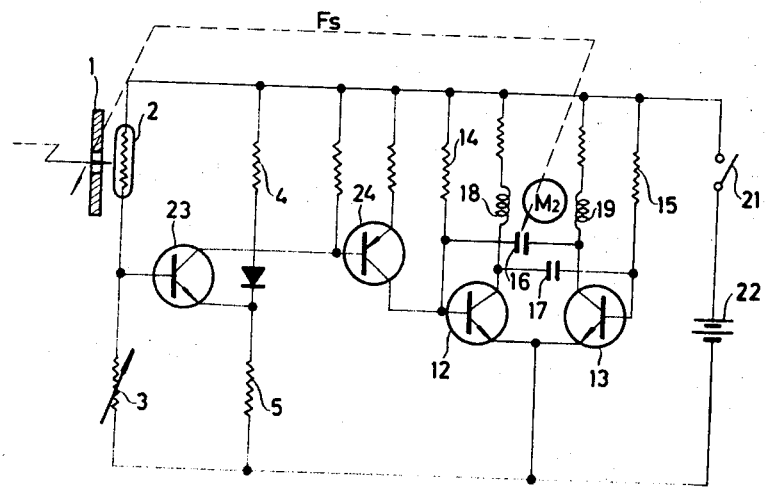
FIG. 5 is a second embodiment of a servo-control system in accordance with the present invention.
Figure 6:
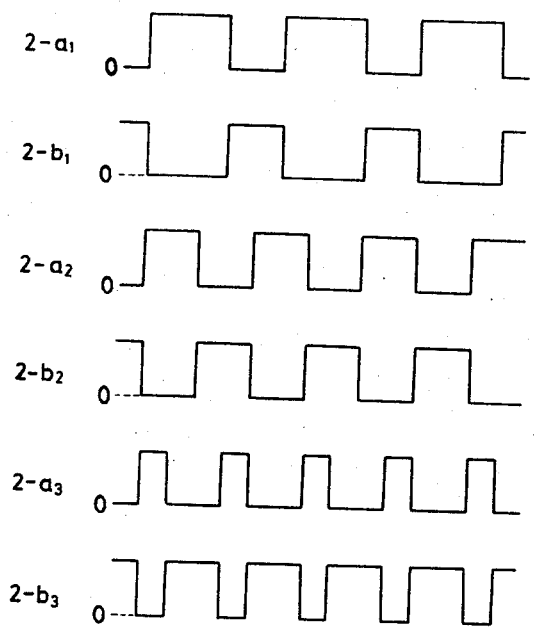
FIG. 6 shows a wave form in the system shown in FIG. 5.

The second embodiment shown in FIG. 5 will be explained referring to FIG. 6. 2-$a_1$, 2-$a_2$ and 2-$a_3$ show wave forms in a driving coil 18, and 2-$b_1$, 2-$b_2$ and 2-$b_3$ show wave forms in a driving coil 19. 6 and 7 are transistors of output detector circuits 23 and 24.

Next, the operation of the embodiment shown in FIG. 5 will be explained. When a pair of time constants in the multivibrator circuit become equal the bridge circuit is supposed to be balanced and the motor is stopped. For this the values $R_{14}$ and $R_{15}$ of the resistors 14 and 15 are selected to be $R_{14} > R_{15}$ in the circuit, if supposed $C_{16} = C_{17}$, in which $C_{16}$ is the capacitance of a capacitor 16 and $C_{17}$ is that of a capacitor 17. In the supposed condition, if there is a small amount of light incident from the body to be photographed and the resistance value $R_2$ of the photo-conductive element 2 is larger than the preset value $R_3$ of the variable resistor for setting the photographing information, the transistors 23 and 24 of the bridge output detector circuit become non-conductive and by the above condition of $R_{14} > R_{15}$, the outputs of the multivibrator give, two driving coils 14 and 15, a pair of pulse currents as shown by 2-$a_1$ and 2-$b_1$ in FIG. 6. Thus, the motor is normally rotated in response to the difference of the pulse length of 2-$a_1$ and 2-$b_1$ and the iris control mechanism 1 is rotated by the motor $M_2$ to regulate the amount of the incident light to the photo-conductive element 2 so as to make $R_2$ equal to $R_3$. If $R_2 \leq R_3$, the transistors 23 and 24 become conductive and the output circuit of the output transistor 24 is put in parallel with the resistors 14 of the multivibrator. Thus the equivalent resistance $R_E$ of the time constant circuit with the resistor 14 is decreased and the resistance $R_E$ becomes equal to $R_{15}$. In this condition, the output of the multivibrator has such pulses as shown by 2-$a_2$ and 2-$b_2$ in FIG. 6, and the driving torque is balanced with the braking torque in the motor, which responds to a stop condition.

When the amount of the incident light is remarkably increased, the resistance $R_2$ becomes much smaller than $R_3$, and the transistors 23 and 24 become conductive again, whereby the output circuit of the transistor 24 is put in parallel with the resistor 14 again, and the equivalent resistance $R_E$ becomes smaller than $R_{11}$. In this condition pulses as shown by 2-$a_3$ and 2-$b_3$ are given from the multivibrator to the motor $M_2$ to cause a rotation motion in a reverse direction in response to the difference of the pulse lengths until a balanced condition of $R_2 = R_3$ obtained.

In this embodiment, the detector circuit is of one channel type and the output transistor 24 functions as a valuable impedance element. And thus the detector circuit can be simply constructed with a sufficient braking function. So, the effective system for prevention of a hunting can be constructed in a small size to be useful as a servo-control system for a movie camera or the like.

Figure 7:
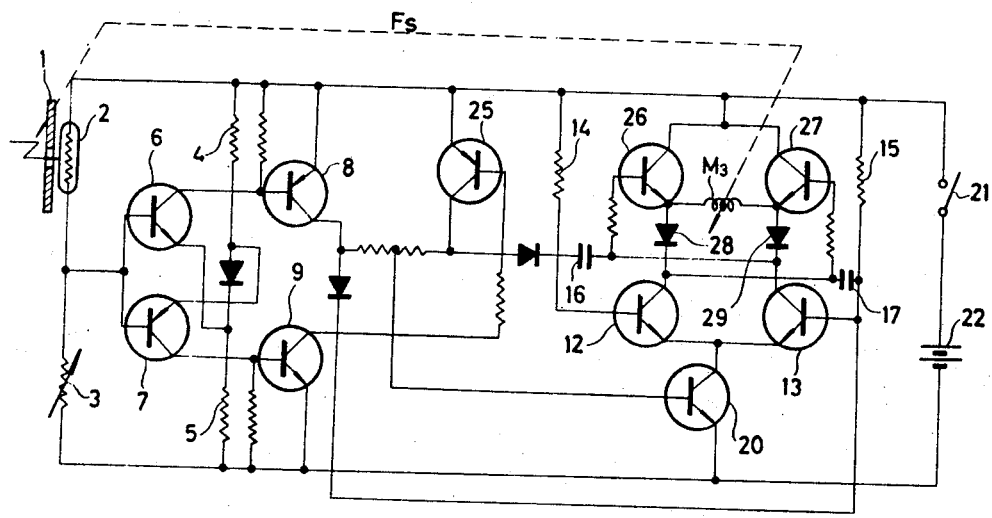
FIG. 7 is a third embodiment of a servo-control system in accordance with the present invention.

The third embodiment shown in FIG. 7 will be explained referring to FIGS. 4 and 8. In this embodiment 9 is a transistor for reversing phases; 8 and 25 are output transistors; and 12, 13, 26 and 27 are transistors composing an astable multivibrator of a bridge connection structure. 14 and 15 are resistors, and 16 and 17 are capacitors. 28 and 29 are diodes for preventing a reverse current. $M_3$ is a motor.

Next, the operation of the third embodiment will be explained. If the amount of light incident to a photo-conductive element 2 reaches a suitable value for a balanced condition of the resistance bridge circuit, all of the transistors of the output detector circuit become non-conductive and the starter transistor 20, connected with the output terminals of the detector circuit, becomes non-conductive. Thus, the astable multivibrator circuit does not begin to oscillate and no current is given to a single driving coil of the servo motor $M_3$. Thus the motor is kept in a stop condition and the bridge circuit remains in a balanced condition. If the amount of light incident to the photo-conductive element 2 is decreased and the resistance value becomes larger, one of the first stage transistor 7 becomes conductive due to the output from the resistance bridge circuit and the transistors 9 and 25 become conductive. Then, the starter transistor 20 becomes conductive and the multivibrator begins to oscillate. At this time, the resistor 14 in one of the time constant circuits of the multivibrator is put in parallel with the impedance of the output transistor 25 of the detector circuit. The time constant becomes shorter and a positive or negative pulse, having different lengths, as shown by 3-$c_2$ in FIG. 8 passes through the single driving coil of the motor $M_3$. The motor $M_3$ is rotated in a normal direction due to the difference of the length of the positive pulse and the negative pulse, to operate the automatic iris control mechanism and to bring back the bridge circuit to a balanced condition.

In this case, the relation of the driving torque of the motor to the output from the bridge circuit generated by the motor $M_3$ with a common coiling is similar to that shown in FIG. 4.

In the condition of the left-half side of FIG. 4, the motor is supposed to be normally rotated, as a positive resultant torque being generated, and in the condition of the right-half side, it is reversely rotated, as a negative resultant torque being generated.

Figure 8:
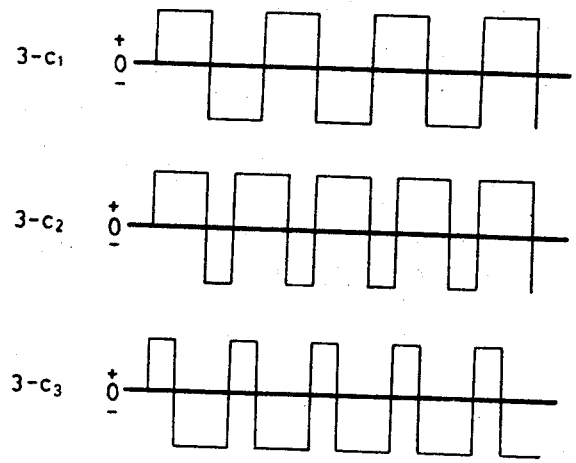
FIG. 8 shows a wave form in the servo-control system shown in FIG. 7.

When the bridge circuit approaches to a balanced condition, pulses having such a wave form as shown by $3-c_1$ in FIG. 8 passes through the common driving coiling, and when the difference of the length between the positive pulse and the negative pulse becomes zero, the motor stops. In this condition, the bridge circuit is balanced and the transistors 7, 9 and 25 turn off. So, the starter transistor 20 also turns off and the oscillation of the multivibrator is stopped.

Next, when the amount of light incident to the photoconductive element 2 is increased, the transistors 6 and 8 become conductive. Then, the starter transistor 20 becomes conductive and the multivibrator begins to oscillate. Such pulses as shown by $3-c_3$ in FIG. 8, passes through the common coiling of the motor $M_3$. Accordingly, the motor $M_3$ is driven in a reverse direction due to the difference of the length between the positive pulse and the negative pulse, and the bridge circuit is brought back to a balanced condition again. In this case, the resistor 15 of the multivibrator is put in parallel with the impedance of the output transistor 8.

In the above embodiment, the motor $M_3$ having a single driving coiling is driven by two outputs of the astable multivibrator composed in a bridge structure. This embodiment is prevented from a hunting phenomenon because the braking torque is always given as well as the driving torque. And when the bridge circuit is balanced, the multivibrator is stopped in oscillation. So, a stable operation can be performed and the servo-control system can be constructed with a quite high degree of precision.

Figure 9:
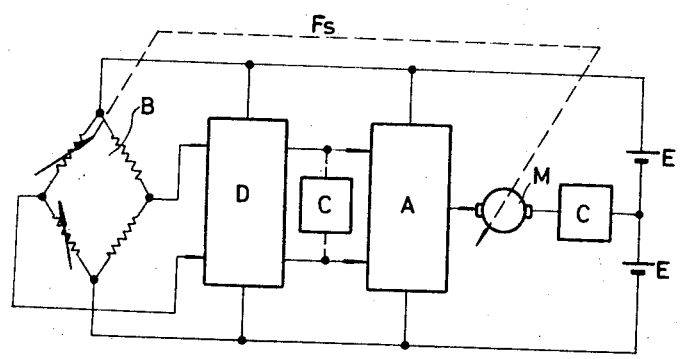
FIG. 9 is a block diagram of a fourth embodiment of a servo-control system in accordance with the present invention.

In the fourth embodiment shown in FIG. 9, B is a comparator circuit such as a bridge circuit, a differential amplifier circuit, which comprises a variable resistor, interlocking with a motor M; D is a detector circuit; C is a controller circuit such as a chopper circuit or a pulse oscillating circuit. The controller circuit C may be selectively connected at a position as illustratively shown in FIG. 9. A is an amplifier circuit and E is a power source. The unbalanced output from the bridge circuit B is put in the detector circuit D, composed of, for example a complimentary transistor circuit and according to the polarity of the output, one of the elements becomes conductive and the other becomes non-conductive in the detector circuit D. The output of the detector circuit D is put into the amplifier circuit A and the positive or negative driving current passes through the motor M to make it rotate in a normal or reverse direction.

The resistance of the variable resistor in the comparator circuit is made to change in response to the rotation of the motor M as shown with the feed back loop Fs and the comparator circuit B is brought back to a balanced condition. As shown in FIG. 9, an electronic or electromagnetic chopper circuit C is inserted between the detector circuit D and the amplifier circuit A, or in the motor circuit whereby the driving current passing through the motor is made intermittent. The period of intermittence is given with a suitable value by regulation of the chopper circuit C to eliminate the hunting phenomenon. The hunting of the motor M is caused by a mechanical inertia, a response velocity of an electric circuit, etc. and can be eliminated by the property selected speed of the motor. As a chopper circuit C, various pulse oscillating circuits may be used, as well as an electromagnetic relay, etc.

Figure 10:
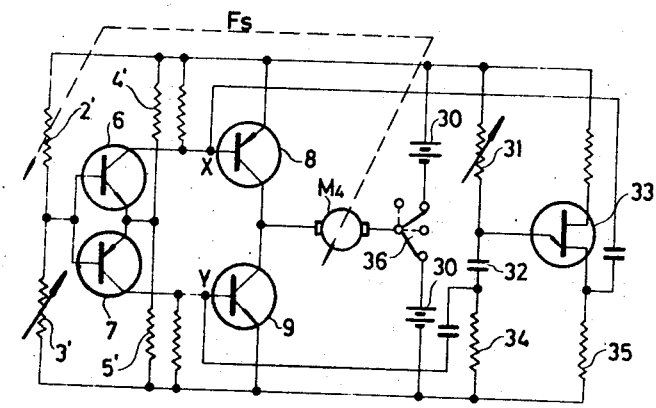

FIG. 10 shows a modification of the fourth embodiment shown in FIG. 9. In FIG. 10, 2' is a variable resistor, the resistance value of which is made to change by a motor $M_4$; 3', 4' and 5' are resistors composing a bridge circuit with the variable resistor 2'. When applied to a camera, a photographing informations such as the film sensitivity, the frame number, the picture illumination may be set by these resistors. 6 and 7 are transistors composing the first stage of the complimentary detector circuit; 8 and 9 are output stage amplifier transistors; and 30 is a current source. 31 – 35 are respective elements of a pulse oscillating circuit for a chopper action. 31 is a variable resistor to change the time constant in the oscillating circuit; 32 is a capacitor; 33 is a double base diode for oscillation; and 34 and 35 are load resistors for generating an output pulse on both terminals X and Y respectively. The positive and negative pulses are put in the bases X and Y of the amplifier circuit, and the motor driving current passing through the transistors 8 or 9 is made intermittent. Supposing the resistor 2' has a low resistance value, the transistors 6 and 8 become conductive and 7 and 9 become non-conductive, whereby the motor $M_4$ is rotated in one direction and in interlocking with this through the loop Fs, the resistance of the variable resistor 2' is made to increase. Thus, when the resistance value arrives at a certain point, the bridge circuit is balanced and the motor $M_4$ is stopped. Pulses from the pulse oscillating circuit, consisting of elements 31 to 35 are superposed at the bases X and Y of the transistors 8 and 9 respectively, whereby there flows a driving current which eliminates a hunting action through the motor $M_4$ when the motor is rotated by a driving current. Thus, the motor $M_4$ is stopped without a hunting action and the bridge circuit becomes balanced. In the circuit of FIG. 10, the pulse signal (or a circuit turning "on" or "off" with a pulse) may be inserted in series between one of the terminals of the motor $M_4$ and the current source. 36 is a main switch with two similar switching elements associated to each other.

FIG. 11 shows another modification of the fourth embodiment shown in FIG. 9, in which a multivibrator circuit is used in combination with a circuit for deriving a motor with two driving coils 37 and 38. A bridge circuit, a detector circuit and an amplifier circuit are similar to those of the example shown in FIG. 10. 39 and 40 are transistors, composing an astable multivibrator. 41 and 42 are capacitors of the oscillating circuit, and 43 and 44 are resistors. The period of oscillation of the multivibrator is made to change by the above resistors 43 and 44. The interlocking arrangement of the resistors 43 and 44 may be preferable. As the motor having two driving coils 37 and 38 is adopted, the system can be operated by a single power source 22. When the bridge circuit is in an unbalanced condition, one of two driving coils 37 and 38 is supplied with a driving current. But, this current can pass only when one of the transistors 39 and 40 of the multivibrator becomes conductive. Therefore, the current through the coils 37 or 38 is made intermittent by the period of oscillation of the multivibrator. The hunting phenomenon can be prevented by suitably selecting this period, i.e. the pulse length through the variable resistors 43 and 44. Namely, the multivibrator circuit offers a chopper effect.

FIG. 12 shows another modification of the fourth embodiment shown in FIG. 9 in which the thyristers 45 and 46 are used for a detector circuit. In this modification, a chopper circuit C is inserted in series with the motor $M_5$ to make the driving current intermittent. The hunting phenomenon can be prevented by suitably selecting the period of intermittence. The thyristor 45 is a silicon controlled rectifier of a positive gate and the thyristor 46 is one of a negative gate. As a chopper circuit, an electronic or electromagnetic chopper or various kinds of pulse oscillating circuits may be used.

Figure 13:
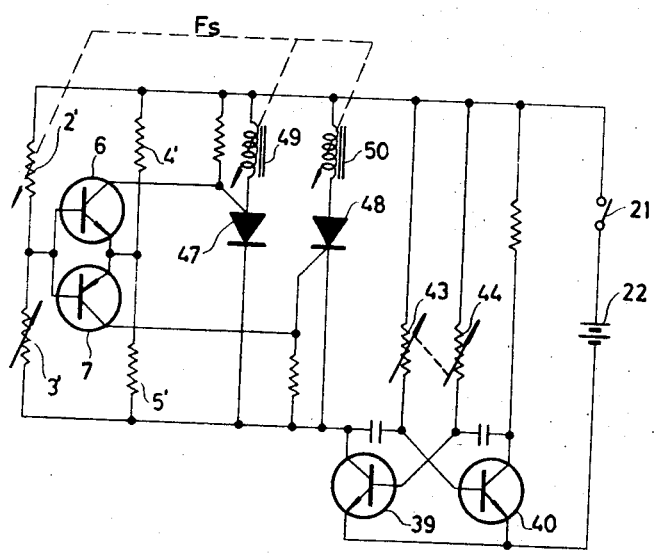

FIG. 13 shows a still another modification of the embodiment shown in FIG. 9 and which is similar to the modification shown in FIG. 11. In this modification the transistors 6 and 7 and thyristers 47 and 48 are used in a detector circuit to drive a motor having two driving coils 49 and 50, and a multivibrator is used for a braking action. The operation of this modification is almost same to that of the modification shown in FIG. 11. But, in this modification the silicon controlled rectifier 48 of a positive gate and the silicon controlled rectifier 47 of a negative gate are used in the detector circuit, and the driving current passes through either one of two driving coils 49 and 50. This driving current is interrupted according to the oscillating period of the multivibrator having the transistors 41 and 42, and thus offers a braking action. Accordingly, the hunting phenomenon can be eliminated by changing the resistance of the variable resistor 43 and 44 for selecting the period suitably. In this example, two driving coils may be replaced by a single driving coil with some modification. In this embodiment an effective braking action is assured and a narrow non-sensitive zone is realized. The system may be easily composed of only electronic circuits and is suitable an IC construction. An external control of an oscillation circuit may be applied to the system from outside and thus a quite useful system is obtained.

Figure 14:
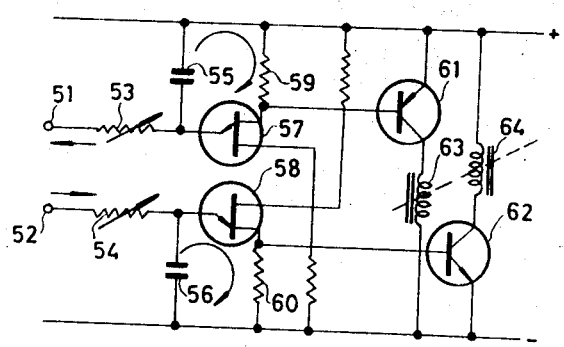
FIG. 14 is a schematic circuit diagram showing a fifth embodiment of a servo-control system in part in accordance with the present invention.

The fifth embodiment shown in FIG. 14 in part and in FIG. 16 in whole will be explained referring to FIG. 15. In this embodiment, 51 and 52 are input terminals, in which for example the output from a bridge circuit or the like is applied. 53 and 54 are variable resistors for regulation of the input; 55 and 56 are capacitors composing respectively time constant circuits. With the resistors 53 and 54 the period of a pulse oscillating circuit is decided. 57 and 58 are double base diodes for oscillation; 59 and 60 are load resistors; and 61 and 62 are transistors for coils 63 and 64 of the motor respectively. The coils 63 and 64 are wound with a polarity opposite to each other.

In this embodiment, if the input terminal 51 is given the current of the leftwise direction, the capacitor 55 is charged in such a time constant as determined by the resistor 53. When the terminal voltage of the capacitor 55 reaches a prescribed value, the charge across the capacitor 55 is discharged toward the clockwise direction through the resistor 59 and the double base diode 57, and a negative pulse voltage in respect to a pulse electrode is resulted in the load resistor 59.

The resulted pulse makes the transistor 61 conductive and the pulsive current passes through the driving coil 63 of the motor to rotate the motor, whereby, for example a variable element of the bridge circuit is made to change and a bridge balance is brought back. When the bridge approaches to a balanced condition, the value of the signal current is decreased at the input terminal 51 of the circuit. It delays the charging time of the capacitor 55 through the resistor 53, and elongates the time intervals of the pulses from the load resistor 59. However, the pulse length is always constant. The resulted pulsive current takes such a wave form as shown in FIG. 15. The period of the resulted pulse may be suitably selected by changing the resistance of the variable resistor 53 and regulated so as to eliminate a hunting of the motor.

Figure 15:
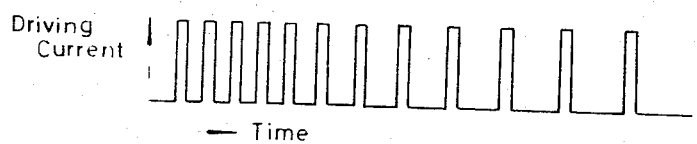
FIG. 15 shows a wave form for illustration of the transient characteristics of the servo-control system shown in FIG. 14.

When the input terminal 52 is applied with the signal current in the rightwise direction, the driving current of a pulse shape as shown in FIG. 15 passes in the same manner as above, through the driving coil 64 of the motor to bring the bridge back to a balanced condition. In this case, a positive pulse in respect to a minus electrode is generated in the load resistor 60. The positive pulse makes the transistor 62 conductive to permit the current through the driving coil 64, and the motor is rotated in the opposite direction to that of the above-mentioned case.

Figure 16:
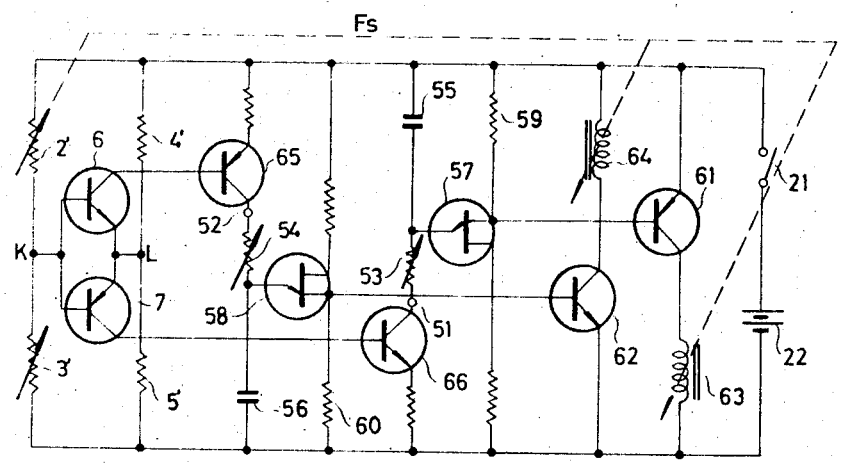
FIG. 16 is a schematic circuit diagram showing the fifth embodiment of the servo-control system in whole.

In FIG. 16, 2' is a variable resistor, interlocked with a motor; 3' is a variable resistor, for example, for setting various kinds of information; 4' and 5' are resistors, composing the bridge circuit with the above resistors 2' and 3'; 6 and 7 are transistors of a complimentary detector circuit; and 65 and 66 are amplifier transistors, which control the period of the pulse (the time interval of the pulse) from the pulse oscillating circuit according to the output signal of transistors 6 and 7.

Supposing that the main switch 21 is closed, and the bridge circuit is unbalanced to result a potential difference between output terminals K and L. Now, if the voltage at the terminal K is higher than the voltage at the terminal L, the transistor 6 becomes conductive and the transistor 7 becomes non-conductive in the complementary detector circuit. When the transistor 6 is turned on, the transistor 65 is also turned on. Through the output circuit of the transistor 65 and the variable resistor 54, the capacitor 56 is charged. The time interval of the pulse is determined according to the time constant. Namely, the time interval, during which the terminal voltage is increased to a prescribed value, is determined by the preset value of the variable resistor 54 and the resistance value of the elements in series thereto, that is the output resistance of the transistor 65 and the resistance of the emitter resistor. The output resistance of the transistor 65 is made to change according to the potential difference between the bridge output terminals K and L. Accordingly, the driving current, passing through the motor, changes transiently with time as shown in FIG. 15. Thus the driving power is decreased before the stoppage of the motor. Thus, a braking effect is expected. When the potential at the terminals K is lower that at the terminal L, the transistor 7 is turned on, and then, the transistor 66 is also turned on. The double base diode 57 begins to oscillate in the same manner, and the driving current of a pulse shape as shown in FIG. 15 passes through the driving coil 63 of the motor. When the driving current is put in one of the coils 63 and 64, the motor is rotated in one direction, while, when the current passes through the other coil, the motor is rotated in another direction, whereby the variable resistor of the bridge circuit is controlled to a balanced condition. The time interval of the pulse is elongated as the bridge approaches to a balanced condition and thus, a braking action is electronically and effectively performed and a narrower non-sensitive zone is assured.

Figure 17:
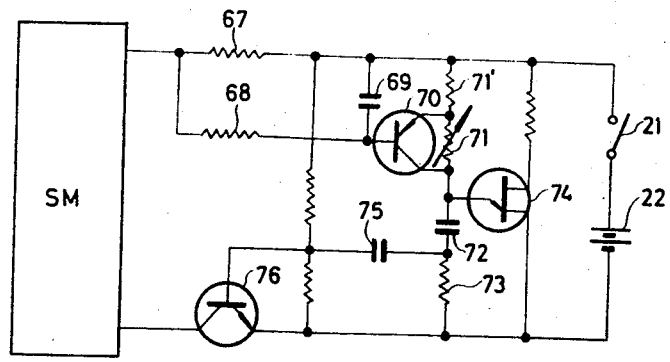
FIG. 17 is a schematic circuit diagram, showing a sixth embodiment of a servo-control system in accordance with the present invention.

The sixth embodiment shown in FIGS. 17 and 18 will be explained. In FIG. 17, SM shows a servo-control system composed of, for example, a bridge circuit, a transistor detector circuit and a motor. 67 is a series resistor; 68 is a trimmer resistor for regulation of a rising time; 69 is a capacitor; 70 is a transistor; 71 is a variable resistor for regulation of a braking action; 71' is a resistor; 72 is a capacitor of a pulse oscillating circuit; 73 is a load resistor; 74 is a double base diode for pulse oscillation; 75 is a coupling capacitor; 76 is a chopper transistor; 21 is a switch for a current source; and 22 is a power source.

Next, the operation of the embodiment shown in FIG. 17 will be explained. When the main switch 21 is closed, a current passes into the servo-control system SM through the series resistor 67 and the transistor 76 from the cell 22 to bring the system into operation. The double base diode 75 begins to oscillate. The period of the pulse is determined by a time constant of the oscillating circuit, namely the capacitor 72 and the resistor 71. The pulse negative in respect to the minus electrode of the battery 22 is generated at the load resistor 73, and the negative pulse is applied to the base of the transistor 76 through the coupling capacitor 75. Thus, the transistor 76 effects a chopper action and permit to pass the current intermittently into the servo-control system from the current source 22, only when no pulse is applied to the chopper 76. Accordingly, by suitably controlling the variable resistor 71 of the oscillating circuit, the speed of the motor can be regulated so as to eliminate a hunting. The voltage drop owing to the intermittent current, passing through the series resistor 67, is applied to the base of the transistor 70 through a time constant circuit of the capacitor 69 and the variable resistor 68.

Suppose that the motor is supplied with the driving current and the motor is started. At the starting stage, a certain voltage is not given to the base of the transistor 70 due to the delay time of the time constant circuit, so that the transistor 70 remains in an off state and thus the period of the pulse in the pulse oscillating circuit is elongated. Accordingly, the driving power of the above-servo motor is increased. The delay time of the above-mentioned time constant circuit can be suitably selected by regulation of the variable resistor 68, and it is possible to quicken properly the rising of the motor and as well as to prevent an overshoot. After the delay time, the transistor 70 turns on. To shorten the pulse period and thus the driving power of the motor is decreased. Thus, the braking action can be performed.

Figure 18:
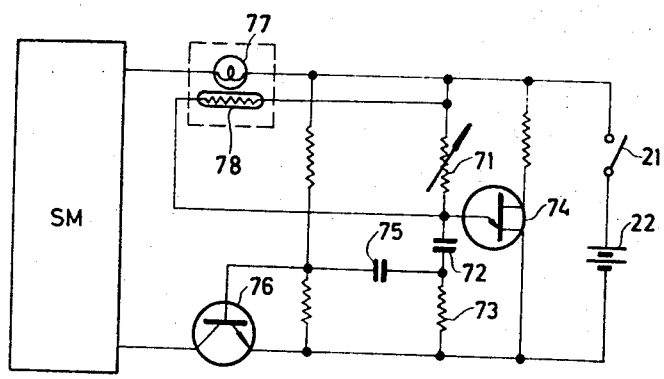
FIG. 18 is a schematic circuit diagram, showing a modification of the sixth embodiment.

FIG. 18 shows another example of the sixth embodiment. In FIG. 18, there is used a photo-coupler, composed of a photoelectric element 78 and a lamp 77. The pulse current, passing through the servo-control system SM, is applied to the lamp 77, and the radiated amount of light from the lamp 77 is detected by a photoconductive element 78 to regulate the resistance value of the time constant circuit of the pulse oscillating circuit. For delaying the chopper action, the delay characteristics of the lamp 77 and the photoconductive element 78 are utilized. At the start of the motor, due to the delay in the lamp 77 and the photoconductive element 78, the period of the pulse oscillation is elongated and determined by the resistor 71 and the capacitor 72, and thus the driving power of the motor is increased. But, after a certain time, the period of the pulse is shortened and determined by an equivalent resistance value of a combined circuit of the resistor 71 and the photoconductive element 78 in parallel thereto and the driving power of the motor is decreased to perform a braking action, whereby the rising is quickened and the similar effect as that of the circuit shown in FIG. 17 is obtained.

In the sixth embodiment, the current is made intermittent by the chopper action of the pulse oscillator and the transistor 76, and the braking operation is electronically performed. Besides, at the start of the motor, the period of intermittence is elongated to quicken the rising of the system. Thus, these examples in FIGS. 17 and 18 can make a very effective servo-control system and are quite useful as a servo-control system for a camera or the like.

Figure 19:
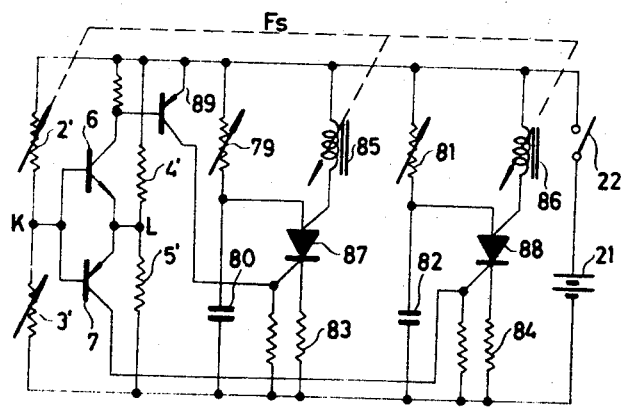
FIG. 19 is a schematic circuit diagram, showing a seventh embodiment of a servo-control system in accordance with the present invention.
Figure 20:
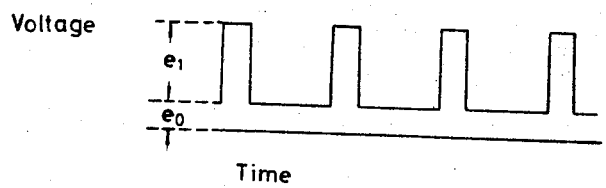
FIG. 20 shows a wave form of the driving current of a motor.

The seventh embodiment shown in FIGS. 19 and 21 will be explained referring to FIG. 20. 2' is a variable resistor, interlocked with a motor; and 3', 4' and 5' are bridge circuit composing resistors. 6 and 7 are transistors, composing a complimentary detector circuit; 79 and 87 and 88 are thyristers of a four terminal construction (SCS); 89 is an invertor transistor for reversing phases. 79, 81 and 80, 82 are respectively variable resistors and capacitors; one resistor and one capacitor of which compose a time constant circuit for one of the SCS 87 and 88; 83 and 84 are cathode resistors for the thyristers 87 and 88 respectively; and 85 and 86 are driving coils, wound with a polarity contrary to each other to compose a motor. 22 is a switch for a current source 21.

Next, the operation of the embodiment shown in FIGS. 19 and 21 will be explained. When the bridge circuit is in an unbalanced condition, a potential difference is generated between the output terminals K and L. If the potentials of both output terminals K and L are indicated with $V_K$ and $V_L$, and $V_K$ is higher than $V_L$, then the transistor 6 is on and the transistor 7 is off in the complimentary detector circuit. Accordingly, in this case, a controlling signal at the collector is put through the inverter transistor 89 into the cathode gate of the thyrister 87 of a four terminal construction to make the thyrister 87 on, whereby the thyrister 87 begins to oscillate with a time constant, determined by the resistor 79 and the capacitor 80. FIG. 20 shows a pulse shape, generated by this oscillation in an anode gate load 85. When the potential at the cathod gate of thyrister 87 the load becomes higher than $e_o$ of the drawing, the thyrister 87 begins to oscillate and the pulse with its height $e_1$ is generated. According to this pulse, the pulsive current passes through the driving coil 15 of the motor, and thus the motor is rotated in one direction. Accordingly, the variable resistor 2' is regulated to make the bridge balanced. In the same manner, in case of the potential being $V_K < V_L$, the transistor 7 is on and such pulses as shown in FIG. 15 is generated similarly by the thyrister 88, the resistor 81 and the capacitor 82. The pulsive current passes through the other driving coil 86 of the motor to rotate it in the other direction, whereby the variable resistor 2' is brought, so as to satisfy the bridge balance condition. The time constant of the oscillating circuit is made to change by suitably pre-setting the resistance value of the variable resistors 79 and 81 to make proper the rotating speed of the motor, whereby it is possible to prevent hunting or overshoot.

Figure 21:
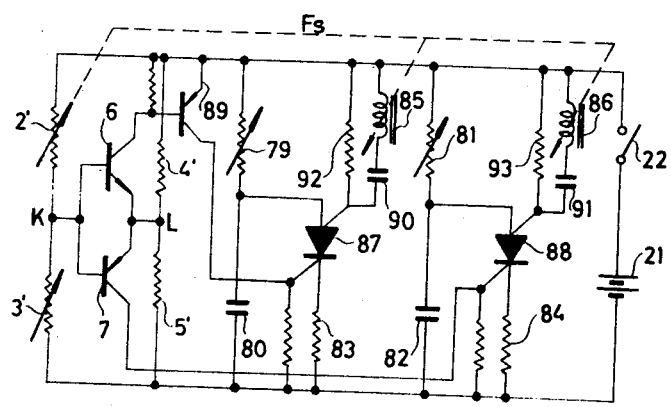
FIG. 21 is a schematic circuit diagram, showing a modification of the seventh embodiment.

FIG. 21 shows another modification of the seventh embodiment. The only difference from the example, shown in FIG. 19 is at an anode gate load circuit of the thyristers. Driving coils 85 and 86 of the motor are connected in series with capacitors 90 and 91 respectively. Load resistors 92 and 93 are also provided in parallel with one of the series connected circuits respectively. Thus, the motor can be driven only in response to the pulse shape with its height $e_1$ shown in FIG. 2. The driving coils 85 and 86 may be connected as the cathode loads of the thyrister 87 and 88 with a slight modification.

In the seventh embodiment as the thyristers of a four terminal construction are employed, it is not necessary to use any turn-off circuit as is necessary in case of a conventional thyrister. Thus the construction of the circuits can be simplified, and the servo-control system can be made very useful for being set in a small sized portable machine, such as a camera or the like.

Figure 22:
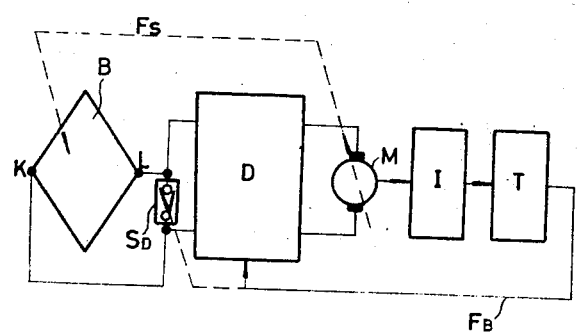
FIG. 22 is a block diagram of an eighth embodiment of the present invention.
Figure 23:
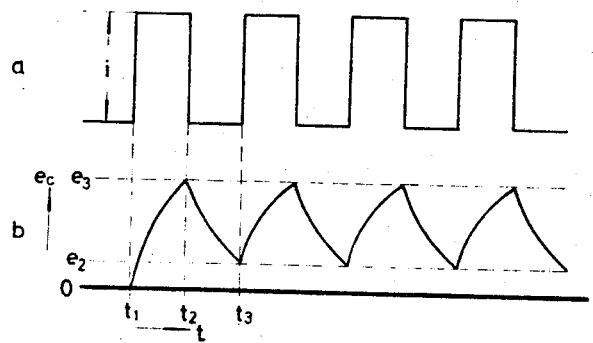
FIG. 23 shows a wave form in the embodiment shown in FIG. 22.

The eighth embodiment shown in blockwise in FIG. 22 and shown schematically and illustratively in FIG. 24 will be explained referring to FIG. 23. In FIG. 22, B is a comparator circuit, such as a bridge circuit, one side of which comprises at least one variable element such as a photoconductive element. K and L are output terminals of the comparator B; SD is a switch such as a semi-conductor switch or the like, for terminating or short-circuiting between the terminals K and L; and D is an output detector circuit for the comparator B. The detector circuit D may be composed of a transistor circuit or an IC circuit, of a bipolar type, a differential amplifier type or the like. M is a motor; I is an integration circuit for detection of the current through the motor M; and T is a switching circuit such as a Schmidt circuit or the like. In FIG. 23, a shows a current, having an rectangular wave form and which current passes through the motor M, and b shows a wave form of the voltage across the capacitor of the integration circuit under a charging and discharging conditions.

When the bridge circuit B is in an unbalanced condition, an unbalanced output is generated between the output terminals K and L, and is detected by the detector circuit D. Then, a driving pulsive current with its height to passes through the motor M. The direction of rotation of the motor M is determined in response to the polarity of the bridge output. The variable element of the comparator B is made change toward a balanced condition. When a voltage drop is caused by the driving current of the motor M therethrough, the drop is detected in the integration circuit T. When the potential $e$ in the integration circuit I value reaches a certain value $e_3$, the switching circuit T is reversed to moves the switch SD, attached to the detector circuit D, the comparator circuit B or the connector circuit between the circuits B and C, thus effecting the turn off of the driving current of the motor M, whereby no driving current of the motor M is given to generate a braking effect. The braking effect will be described in more detail referring to FIG. 23. If one driving current pulse starts to pass through the motor M at the time of $t_1$, the potential in the integration circuit I increases from the time $t_1$ to the time $t_2$ as shown b, and reaches a value $e_3$ at the time $t_2$. During this period of time, the motor M is supplied with the driving current pulse and is driven. The switch $S_D$ is set to open at the time $t_2$ by the output of the switching circuit T. And then the supply of the driving current to the motor M is interrupted. A the moment $t_2$, the potential $e$ begins to decrease in the integration circuit I and reaches another certain value $e_2$ at the time $t_3$ as the result of the discharge characteristics of the circuit. At this time $t_3$, the switching circuit T is again reversed to close the switch SD and the driving current supply to the motor begins again. The potential $e$ starts to increase again. By repetition of the above cycle of operation, the motor is driven by the current, having such an intermittent wave form as shown in FIG. 23. When the bridge B is brought to a balanced state, the output becomes zero and the motor is stopped and thus the system remains in the balanced state.

Figure 24:
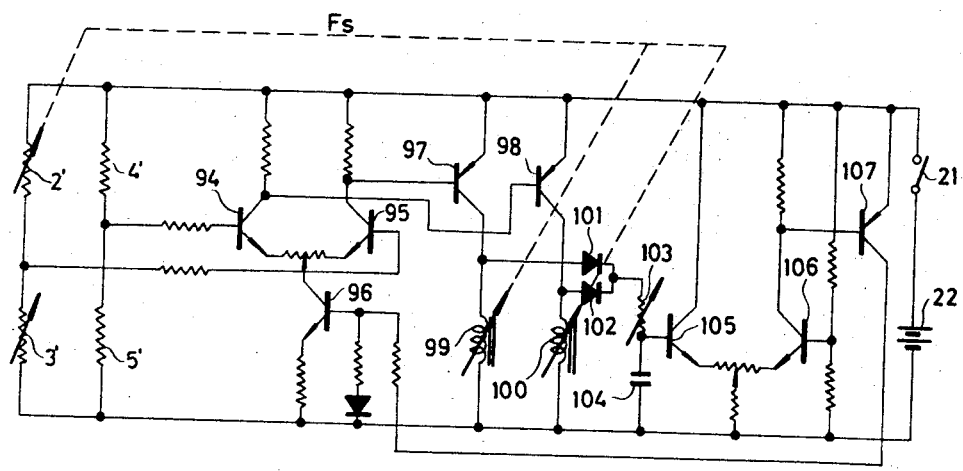
FIG. 24 is a schematic circuit diagram of the eighth embodiment.

FIG. 24 is a schematic circuit diagram showing an example of the eighth embodiment shown in FIG. 22, in which 2' is a variable resistor, the resistance value of which changes in association with the rotation of the motor. It is preferable to use a photo-conductive element as the resistor 2' when the system is applied to an automatic iris control mechanism of a camera. 3' is a variable resistor for a balance regulation of a bridge; and 4' and 5' are bridge circuit composing resistors. 94 and 95 are transistors, composing an output detector circuit of a differential amplification type; 96 is a braking transistor which functions as a constant-current circuit; 97 and 98 are switching transistors, controlled by the outputs of the detector circuit; and 99 and 100 are driving coils, wound in a polarity opposite to each other. 101 and 102 are diodes; 103 is a variable resistor; and 104 is a capacitor. These elements 103 and 104 compose an integration circuit. 105 and 106 are switching circuit composing transistors of a differential amplification type; 107 is an output transistor; 21 is a switch for a current source; and 22 is a power cell.

Next, the operation of the circuit will be explained. When the switch 21 is turned on and the system becomes in an operation condition, if the bridge circuit is in an unbalanced condition, an unbalanced output is generated between the output terminals. Now, let it be supposed that by this output, the transistor 94 becomes on and the transistor 95 becomes off in the detector circuit. In case when the transistor 94 is on, the transistor 98 becomes on and a driving current passes through the driving coil 99 of the motor. At this state, the capacitor 104 of the integration circuit is charged through the diode 101 and the resistor 103, whereby the voltage $e$ across the capacitor 104 is increased in such a wave form as shown in FIG. 23. When the voltage $e$ reaches a certain value $e_3$ which corresponds to the base voltage of the transistor 106, the transistor 105 of the switching circuit turns on and the transistor 106 turns off. Then, the output transistor 107 becomes off and the base voltage of the braking transistor 96 changes in the detector circuit to turn off. Accordingly, the transistors 94 and 95 of the detector circuit are together turned from actuvation to non-actuvation, and as the transistors 97 and 98 also turn from actuvation to non-actuvation, the driving current is interrupted. Then, the electric charge across the capacitor 104 begins to be discharged with a certain time constant through the transistor 105. When the value $e$ reaches a certain value $e_2$, the starting condition is restored. By repetition of the above operation cycle, the driving pulsive current through the coil 99 of the motor takes such an intermittent wave form as shown in FIG. 23, whereby a braking effect is obtained. When the polarity of the bridge output is reversed, an intermittent current of similar wave form passes through the other driving coil 100 of the motor, whereby the bridge approaches to the balanced condition again. When the bridge is balanced, the output becomes zero, and the motor is stopped to keep the balanced condition. The rotation speed of the motor can be freely selected by the variable resistor 103 of the integration circuit.

In the above system, when the voltage of the current source is high, the integration time becomes shorter, whereby the pulse width of the driving current becomes narrower and the speed of the motor becomes lower. On the contrary, when the voltage of the current source is low, the speed of the motor becomes higher. Accordingly, by suitably regulating the time constant of the integration circuit, it is possible to prevent the speed variation, caused by the voltage change of the current source.

In the above circuit, the speed variation caused by the fluctuation of the voltage of the current source is self-compensated. Therefore, a quite stable and effective servo-control system is obtained.

In the above description, the transistors 94, 95, 97 and 98 are supposed to function as switching elements and the braking transistor 96 is supposed to function as a chopper. That is, the height of the pulsive driving current is constant as shown in FIG. 23 and the time constant of the integration circuit is constant as shown in FIG. 23. However, by suitably selecting the values of the elements, the above embodiment may work as follows. In the balanced condition, the current pulses of the same height pass through the coils 99 and 100, while in the unbalanced condition, the current pulses of different height pass through the coils 99 and 100, and the torque in response to the difference in the height of the both current pulses is generated resultantly to control the resistor 2' through the feed-back loop Fs. In this case, the discharge characteristics of the integrated charges across the capacitor 104 is inconsistent, while the charge characteristics of the integration circuit is responsive to the unbalanced output from the bridge circuit. Although the braking transistor 96 functions as a chopper in this case, too, this transistor 96 may be replaced by a constant current source without the feed-back loop FB with a slight modification.

Figure 25:
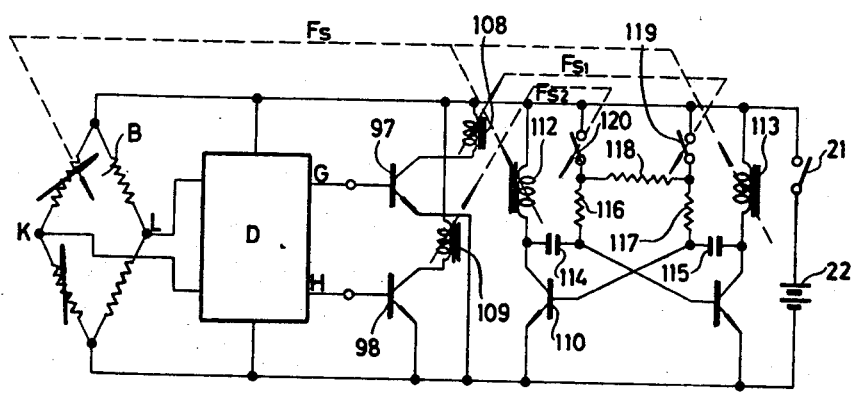
FIG. 25 is a schematic circuit diagram, showing a nineth embodiment of a servo-control system in accordance with the present invention.

The ninth embodiment shown in FIG. 25 will be explained referring to FIGS. 26, 27 and 28. In FIG. 25, B is comparator such as a bridge circuit, D is a bridge output detector circuit, for which a transistor circuit, such as a bipolar type amplifier, a differential amplifier, etc. may be used. 97 and 98 are switching transistors; and 108 and 109 are electromagnetic relays. Switches 119 and 120 are operated by the relays 108 and 109 respectively. 110 and 111 are transistors, composing an astable multivibrator. 112 and 113 are driving coils of the motor wound with a polarity opposite to each other. 114 and 115 are capacitors; 116 and 117, and 118 are resistors. These compose time constant circuits. 21 is a switch for a current source 20.

Next, the operation of the system will be explained. When the comparator circuit B is in an unbalanced condition, an unbalanced output is generated between output terminals K and L. If this output is put into the detector circuit, an output signal is generated at either one of two output terminals G and H of the detector circuit D according to the polarity of the unbalanced output. Now let it be supposed that the output is generated at the terminal G. By the output from G, the transistor 97 is on and the current is passed through the electromagnetic relay 108, whereby 119 is made on. When the switch 119 becomes on, the astable multivibrator circuit is activated to begin oscillation. In this condition, the charge across the capacitor 114 discharges through the resistors 116 and the resistor 118 combined in series with each other, and the charge across the capacitor 115 discharges through only the resistor 117. Now, let it be supposed that the capacitance of the capacitor 114 is equal to that of the capacitor 115 and the resistance of the resistor 116 is equal to that of the resistor 117. The time constant of the circuit including the capacitor 114 becomes longer than that of the circuit including the capacitor 115, whereby the period of time of current passage in the driving coil 112 of the motor becomes longer than that of the coil 113. Thus the motor is rotated by the difference of the periods. Thus the comparator is brought to a balanced state. When the comparator B is balanced, the outputs of the detector circuit D become zero. The transistor 97 is turned off and the current through the electromagnetic relay 108 is interrupted to open the switch 119, whereby the discharge path of the multivibrator is turned off. The oscillation is stopped and the motor is also stopped. When the polarity of the comparator output is reversed, the output is generated at the output terminal H of the detector circuit D. The transistor 98 becomes on, and the switch 120 is brought to close by the electromagnetic relay 109. The multivibrator begins to oscillate again. The motor is rotated in the opposite direction to make the comparator approach to a balance state.

The current pulses passing through the driving coils of the motor are given an intermittent wave form, and by the difference of the pulse length, the motor is rotated in either normal or reverse direction, whereby a braking action is effected and it is possible to prevent a hunting phenomenon without any specific braking mechanism.

Figure 26:
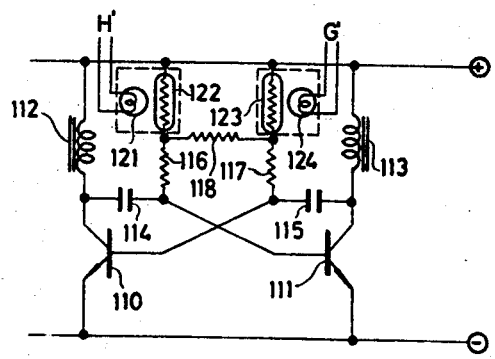
FIGS. 26 to 28 are schematic circuit diagrams of modifications of the ninth embodiment in part.
Figure 27:
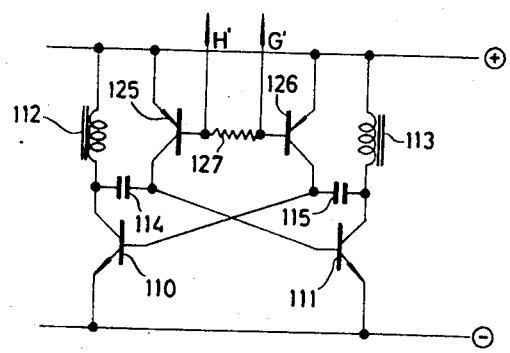
Figure 28:
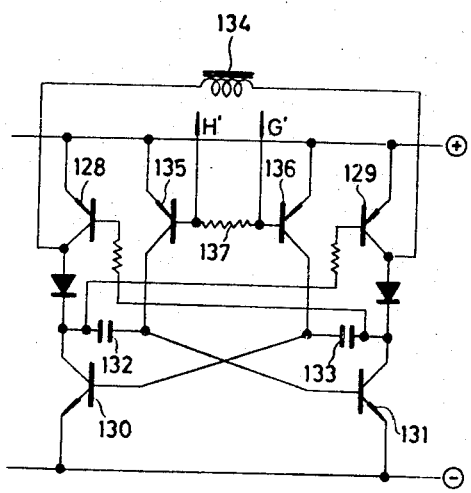

FIGS. 26 to 28 show another examples of the ninth embodiment in part respectively. In the circuit of FIG. 26, a photocouplar, consisting of a small-sized lamp and a photoconductive element, is utilized instead of the electromagnetic relay, used in the example shown in FIG. 25. The other circuit construction is almost similar to that of FIG. 25. The operation is also almost same to that of the system in FIG. 25. But the output, generated at the output terminals G or H, makes the switching transistor 97 or 98 on to illuminate either one of the small-sized lamp 121 or 124. G' and H' correspond to G and H of FIG. 25. Now, let it be supposed that the lamp 124 is illuminated. The resistance value of the photo-conductive element 123 becomes low and the discharge paths for the capacitors 114 and 115 become conductive to activate the astable multivibrator circuit. At this state, the charge across the capacitor 114 discharges through the resistors 116, 118 and 123, while the charge across the capacitor 115 discharges through the resistors 117 and 123. If the resistance of the resistor 117 is equal to that of the resistor 116, the discharge times become different from each other, whereby the motor is rotated in one direction in the similar manner as in FIG. 25. When the comparator B is balanced, the output of the detector circuit D becomes zero, and both of the small-sized lamps 123 and 124 are put out. The resistance values of both photoconductive elements 122 and 123 become almost infinite and the oscillation of the multivibrator is stopped. Thus, any mechanical switch is not necessary in this example, so that there is no miss in operation as caused by a wrong contact or the like and it is possible to perform a stable operation.

In FIG. 27, an output circuit of a transistor 125 or 126 is utilized to compose the discharge paths of the multivibrator. The output from the detector circuit D is put at the base H' or G' of the transistor 125 or 126, whereby the resistance value of the output circuit is made to change. Namely, if an output is generated at the output terminal G of the detector circuit D and is put at the base G' of FIG. 27, the output is put directly to the transistor 126, and through the transistor 127 to the transistor 125. The resistance value of the output circuit of the transistor 125 becomes larger than that of the transistor 126. Accordingly, the pulse lengths of the intermittent wave, passing through two driving coils, become different from each other to rotate the motor in one direction and to balance the comparator. When there is no output at both output terminals G and H of the detector circuit D, the output resistance values of the transistors 125 and 126 become almost infinite and the oscillation of the astable multivibrator is stopped.

FIG. 28 shows a modification of the circuit shown in FIG. 27, in which a motor having a single driving coil 134 is used. The only difference from that shown in FIG. 27 is that the multivibrator circuit with four transistors 128 to 131 is used for driving the single coil 134. The output circuit of the transistor 128 to 131 are connected to compose a bridge circuit. The operation of this example is similar to that shown in FIG. 27. In this circuit, the output of the detector circuit D is put to the base H' or G' of the transistor 135 or 136. According to the change of the output resistance value of the transistor 135 or 136, the pulse length of the current passing through the driving coil 134 of the motor is made to change. And the pulse length of the current, flowing in one direction is made larger than that of the current flowing in the other direction, whereby the motor is rotated in one direction to make the bridge balanced. In this circuit, when an input is not put in the base H' or G' of the transistors 135 or 136, the output resistance value becomes almost infinite and the oscillation is stopped. Meanwhile 132 and 133 are capacitors corresponding to those 114 and 115 in FIG. 27 and 137 is a resistor corresponding to that 127 in FIG. 27. In the above embodiment, the start or stop of the motor is performed through oscillation or non-oscillation caused by the multivibrator circuit in response to the input thereto. Therefore, the circuit is simplified and suitable for a camera or the like.

The 10th embodiment shown in FIG. 29 will be described hereinafter.

Figure 29:
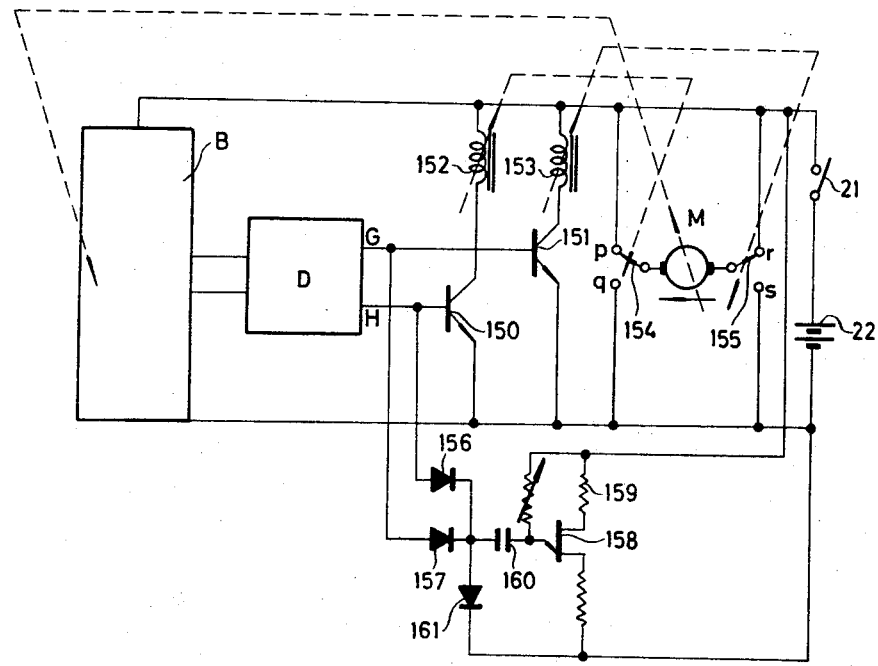
FIG. 29 is a schematic circuit diagram showing a 10th embodiment of a servo-control system according to the present invention.

In FIG. 29, B is a comparator circuit, D is a detector circuit, G and H are output terminals of the detector circuit, 150 and 151 are output transistors, and 152 and 153 are electromagnetic relays respectively associated with the switches 154 and 155. 156 and 157 are one way switches such as diodes, 158 is a double base diode, 159 is a variable resistor and 160 is a capacitor, both of which compose a time constant circuit of an oscillator circuit with the double base diode 158. 161 is a diode and 21 is a main switch for a current source 22.

In this embodiment, the change over switches 154 and 155 are supposed to contact with terminals p and r respectively in case when no current passes through the coils of the relays 152 and 153. Due to the current through the relay 152, the switch 154 is changed over from the terminal p to a terminal q. Then the leftwise current through a motor M rotates the motor in one direction. On the contrary, when the switch 155 is changed over from the terminal r to a terminal s due to the energization of the relay 153, the motor M rotates in the other direction. When the main switch 21 is closed to activate the system and if the comparator B is in unbalanced state, the output therefrom is detected by the detector circuit D of the bi-polar construction. Thus, either one of the transistors 150 and 151 is made on under the control of an oscillating circuit containing the double base diode 158 which oscillating circuit is activated by closing the main switch 21 and which effects pulsive current through the relays 152 and 153 under the control of oscillator output through either one of the one-way diodes 156 or 157. In this embodiment when the system becomes balanced the motor M works as a generator and promotes braking action. For application to a camera or the like, the photosensitive element in the comparator circuit B may be controlled by the output from the motor.

Figure 30:
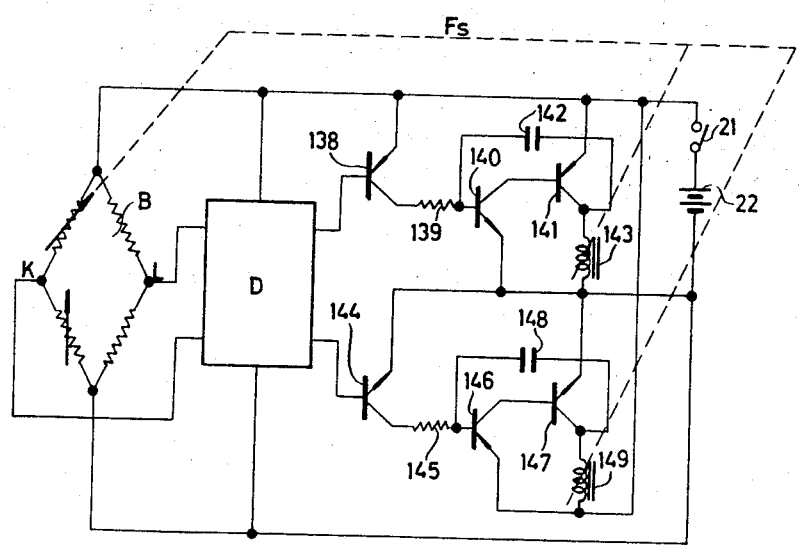
FIG. 30 is a schematic circuit diagram, showing an 11th embodiment of a servo-control system in accordance with the present invention.

The 11th embodiment shown in FIG. 30 will be explained. B is a comparator circuit, D is a detector circuit, 138 and 144 are switching transistors; 139 and 145 are resistors; 140, 141 and 146, 147 are transistors, composing respectively an oscillating circuit; 142 and 148 are capacitors for the oscillating circuit and 143 and 149 are driving coils of the motor and wound in a polarity, opposite to each other.

Next, the operation of the system will be explained. Now, let it be supposed that the comparator circuit B is in an unbalanced condition and the output is detected by the detector circuit D, and the transistor 138 is on and the transistor 144 is off. The collector current of the transistor 138 passes through the resistor 139 to the transistor 140. The transistors 140 and 141 become on, whereby the current flows in the driving coil 143 of the motor. Then the capacitor 142 is charged, and when the transistor 141 reaches a saturation by the feedback action, the current flowing through the capacitor 142 is interrupted and the transistor 140 becomes off. Accordingly, the transistor 141 is turned off and the charge across the capacitor 142 is discharged through the resistor 139 and the transistor 138. By repetition of the above operation, the transistors 140 and 141 permit to pass a rectangular wave current through the driving coil 143 to rotate the motor in one direction and the comparator, interlocking with the rotation of the motor, is brought to a balanced condition. When the comparator B is balanced, the output of the detector circuit D becomes zero and the transistor 139 is turned off to stop the rotation of the motor.

In case of the opposite polarity of the output from the bridge circuit, the transistor 144 becomes on by the output from the detector circuit D. The rectangular wave oscillator, consisting of the transistors 146 and 147, begins to oscillate and a driving current having an intermittent wave form is put in the other driving coil 149 of the motor. Thus, the motor is rotated in a reverse direction to make the comparator circuit balanced. In this embodiment, the motor is driven by the current having an intermittent wave form and thus, a braking power is obtained. The polarity of the oscillator consisting transistors may be reversed, and the time constant of the oscillator circuit may be regulated, if necessary.

In this embodiment, the driving current for the motor is given an intermittent wave form by a simple circuit, consisting only of transistors. Therefore, it is easy to make the circuit with an IC. Moreover, because the pulse length can be suitably selected, an appropriate braking power may be obtained to get a quite effective servo-control system.

What is claimed is:

1. A servo-control system comprising a bridge circuit having an output, a detector circuit responsive to the output of said bridge circuit, a motor, a control circuit chopping the output of said detector circuit and applying it to said motor for controlling the motor on the basis of the output of the bridge circuit, feedback means coupling said motor to said bridge circuit for balancing the bridge circuit, and a pulse generator coupled to said control circuit for pulsing said control circuit and causing it to chop the output of the detector circuit.

2. A servo-control system according to claim 1, which further comprises a start switch for the control circuit whereby the control circuit is activated by the start switch under the control of the output of said detector circuit.

3. A servo-control system according to claim 2 in which the detector circuit is of bi-polar structure, the control circuit is an astable multivibrator and the start switch is arranged in series with said astable multivibrator.

4. A servo-control system according to claim 2 in which the detector circuit is of bi-polar structure, the control circuit comprises a pair of pulse oscillators, each of which oscillators is controlled by the output of the bridge circuit through the detector circuit, so as to control the frequency of the output of of each of the oscillators.

5. A servo-control system according to claim 1 in which the motor comprises two coilings of opposite polarity.

6. A servo-control system according to claim 4 in which each of the pulse oscillators is composed of a first and second direct coupled transistors of opposite polarity, and a capacitor connected between the output terminal of the second transistor and the input terminal of the first transistor.

7. A servo-control system according to claim 6, which comprises an iris and the bridge circuit comprises a photosensitive element, whereby the system functions as an automatic camera iris control device.

8. A servo-control system according to claim 3, in which the astable multivibrator is of a bridge connection structure, one of the outputs from the detector circuit is supplied to one of the input terminals of the multivibrator through signal inverting element, and the motor comprises a single coiling.

9. A servo-control system according to claim 4, in which each of the pulse oscillators contains a thyristor of four terminal constructions.

10. A servo-control system according to claim 3 in which a pair of discharge resistors of the astable multivibrator are varied in response to the output of the detector circuit so as to control the pulsive current through the motor as well as to stop the oscillation.

11. A servo-control system according to claim 10 in which each of the discharge resistors contains a contact switch associated with an electromagnet energized by one of the outputs of the detector circuit.

12. A servo-control system according to claim 10 in which each of the discharge resistors is a photoresistor coupled with a lamp energized to illuminate by one of the outputs of the detector circuit.

13. A servo-control system according to claim 10 in which each of the discharge resistors is an output circuit of one of the transistors controlled by one of the outputs of the detector circuit.

14. A servo-control system according to claim 11 in which the astable multivibrator is of bridge connection structure.

15. A servo-control system comprising a comparator circuit, a detector circuit, a motor, a chopper which functions as a pulsive switching circuit, pulse oscillator means coupled to said chopper circuit for causing said chopper circuit to chop at given time intervals, said detector circuit being controlled by the output of said comparator circuit, said motor being controlled by the output of said comparator circuit through said detector circuit under the control of said chopper, and feedback means coupling the motor to said comparator circuit for controlling and bringing the comparator circuit to a balanced condition.

16. A servo-control system as in claim 15, wherein said comparator circuit includes variable resistance means and a plurality of fixed resistance means and two output terminals, said detector circuit being connected electrically with said output terminal, said feedback means operatively connecting said motor to said variable resistance means, electrical source means, said chopper forming a part of a driving circuit electrically coupling said source means to said motor and chopping the driving current of the motor from said source means on the basis of the output of said detector circuit, whereby said motor is pulsively driven.

17. A servo-control system as in claim 15, wherein said pulse oscillator is an astable multivibrator.

18. A servo-control system as in claim 16, wherein said pulse oscillator is an astable multivibrator.

19. A system as in claim 16, wherein the detector circuit comprises a pair of complementary semi-conductors and the chopper comprises a pair of complementary semi-conductors.

20. A system as in claim 16, wherein the detector circuit comprises a pair of thyristors.

21. A system as in claim 16, wherein the pulse oscillator is controlled by the output of the comparator circuit through the detector circuit so as to vary the frequency of the output of the oscillator for the control of the chopper.

22. A system as in claim 16, which further comprises a delay circuit for the control of the output frequency from the pulse oscillator to shorten the rise time of the system, said control of the output frequency being effected through the current chopped by the chopper.

23. A servo-control system as in claim 16, wherein said pulse oscillator forms an astable multivibrator with said chopper, said astable multivibrator having a pair of switching transistors one of which operates as said chopper.

24. A system as in claim 16, wherein said pulse oscillator includes a unijunction transistor having a gate and a capacitance-resistance time constant circuit connected with the gate of said transistor.

25. A system as in claim 16, wherein said comparator circuit includes a bridge circuit having a plurality of branches, one of said branches including said variable resistance means and others of said branches each including one of said fixed resistance means, said detector circuit comprising a pair of complementary semi-conductors having inputs, each input of said semi-conductors being connected with the output of the bridge circuit, said chopper comprising a pair of complementary switching semi-conductors, each semi-conductor being electrically coupled with said source means through said motor.

26. A servo-control system as in claim 18, wherein said comparator circuit includes a bridge circuit having four branches, one of said branches including said variable resistance means and the other of said branches each including one of said fixed resistance means, said detector circuit comprising a pair of complementary semi-conductors having respective inputs, the input of each semi-conductor being connected with the output of said bridge circuit.

27. A servo-control system as in claim 16, wherein said source means comprises two electrical sources, one of said electrical sources being electrically coupled with one of said switching semi-conductors through the motor and the other of which is coupled with the other of said switching semi-conductors through the motor.

28. A servo-control system according to claim 15, in which the detector circuit comprises a pair of complementary semi-conductors and the chopper comprises a pair of complementary semi-conductors.

29. A servo-control system according to claim 15, in which the detector circuit comprises a pair of thyristors.

30. A servo-control system according to claim 15, in which the pulse oscillator is controlled by the output of the comparator circuit through the detector circuit so as to vary the frequency of the output of the oscillator for the control of the chopper.

31. A servo-control system according to claim 15, which further comprises a delay circuit for the control of the output frequency from the pulse oscillator to shorten the rising time of the system, said control of the output frequency being effected through the current choppered by the chopper.

* * * * *